United States Patent
Nawata et al.

(10) Patent No.: US 9,815,457 B2
(45) Date of Patent: Nov. 14, 2017

(54) HYBRID VEHICLE

(71) Applicant: Toyota Jidosha Kabushiki Kaisha, Toyota-shi, Aichi-ken (JP)

(72) Inventors: Hidekazu Nawata, Toyota (JP); Daigo Ando, Nagoya (JP); Yoshikazu Asami, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 120 days.

(21) Appl. No.: 15/080,863

(22) Filed: Mar. 25, 2016

(65) Prior Publication Data
US 2016/0280219 A1 Sep. 29, 2016

(30) Foreign Application Priority Data
Mar. 27, 2015 (JP) .................................. 2015-66885

(51) Int. Cl.
*B60W 10/08* (2006.01)
*B60W 20/50* (2016.01)
(Continued)

(52) U.S. Cl.
CPC ............ *B60W 20/50* (2013.01); *B60W 10/06* (2013.01); *B60W 10/08* (2013.01); *B60W 10/26* (2013.01); *B60W 50/032* (2013.01); *F02D 11/107* (2013.01); *B60W 2050/0295* (2013.01); *B60W 2510/0676* (2013.01); *B60W 2510/244* (2013.01); *F02D 2011/108* (2013.01); *F02D 2041/227* (2013.01); *F02D 2200/021* (2013.01); *F02D 2200/503* (2013.01); *Y02T 10/6286* (2013.01); *Y10S 903/93* (2013.01)

(58) Field of Classification Search
CPC ................. B60W 20/50; B60W 50/032; F02D 2009/0277
See application file for complete search history.

(56) References Cited

U.S. PATENT DOCUMENTS

| | | | |
|---|---|---|---|
| 7,661,406 B2 | 2/2010 | Yokoyama et al. | |
| 2004/0060541 A1* | 4/2004 | Soshino | F02D 9/1045 123/399 |
| 2006/0231072 A1* | 10/2006 | Saito | F02D 9/107 123/396 |

FOREIGN PATENT DOCUMENTS

| | | | | |
|---|---|---|---|---|
| JP | 2006161658 A | 6/2006 | | |
| JP | 2007076551 A | 3/2007 | | |
| JP | 2014218221 A | * 11/2014 | ............ B60W 10/08 |

* cited by examiner

*Primary Examiner* — Redhwan K Mawari
*Assistant Examiner* — Anshul Sood
(74) *Attorney, Agent, or Firm* — Dinsmore & Shohl LLP

(57) ABSTRACT

In the case where a throttle valve has a sticking abnormality, a hybrid vehicle performs failsafe operation (limp home mode) with fixing the throttle valve to an opener position (S100) and sets a restoration diagnosis cooling water temperature T1 such as to decrease with a decrease in state of charge SOC of a battery (S120). When cooling water temperature Tw of the engine becomes equal to or higher than the restoration diagnosis cooling water temperature T1, the hybrid vehicle performs sticking restoration diagnosis to determine whether the throttle valve is restored from the sticking abnormality (S150). This allows for earlier diagnosis of whether the throttle valve is restored from the sticking abnormality at the lower state of charge SOC of the battery and enables the hybrid vehicle to return to normal operation at an earlier time. As a result, this ensures the more adequate sticking restoration diagnosis.

13 Claims, 4 Drawing Sheets

(51) Int. Cl.
  *B60W 10/06* (2006.01)
  *F02D 11/10* (2006.01)
  *B60W 50/032* (2012.01)
  *B60W 10/26* (2006.01)
  *F02D 41/22* (2006.01)
  *B60W 50/029* (2012.01)

HYBRID VEHICLE

CROSS-REFERENCE TO RELATED APPLICATION

The present disclosure claims priority to Japanese Patent Application No. 2015-66885 filed Mar. 27, 2015, which is herein incorporated by reference in its entirety including specification, drawings and claims.

TECHNICAL FIELD

The present disclosure relates to a hybrid vehicle and more specifically a hybrid vehicle that is configured to perform sticking restoration diagnosis of a throttle valve of an engine accompanied with an increase in temperature of cooling water of the engine, when the hybrid vehicle runs in a limp home mode due to a sticking abnormality of the throttle valve.

BACKGROUND ART

A proposed technique performs failsafe control to run the hybrid vehicle in a limp home mode using power of an engine in the case where a throttle valve of the engine has a sticking abnormality, and diagnoses that the throttle valve is restored from the sticking abnormality on satisfaction of a predetermined restoration diagnosis condition (for example, Patent Literature 1). This technique specifies a condition that the hybrid vehicle is during deceleration, a condition that the hybrid vehicle is during acceleration and a condition that a predetermined time has elapsed, as restoration diagnosis conditions and performs restoration diagnosis on satisfaction of any one of these restoration diagnosis conditions.

CITATION LIST

Patent Literature

PTL 1: JP 2006-161658A

Summary Technical Problem

In the case where the throttle valve of the engine has a sticking abnormality, the hybrid vehicle is allowed to run in a limp home mode by not using power from the engine but using electric power from a battery. In some state of charge of the battery, however, the hybrid vehicle may have a difficulty in running in the limp home mode prior to satisfaction of the condition that the predetermined time has elapsed, as the restoration diagnosis condition.

With regard to a hybrid vehicle, an object of the present disclosure is to more adequately perform restoration diagnosis in the case where a throttle valve of an engine has a sticking abnormality.

Solution to Problem

In order to achieve the above primary object, the hybrid vehicle of the present disclosure employs the following configuration.

The present disclosure is directed to a hybrid vehicle. The hybrid vehicle includes an engine, a motor that is configured to output power for running, a battery that is configured to supply electric power to the motor, and an electronic control unit that is configured to control the engine and the motor such as to cause the hybrid vehicle to run in a limp home mode in response to a driver's request when a throttle valve of the engine has a sticking abnormality and configured to perform sticking restoration diagnosis of the throttle valve accompanied with an increase in temperature of cooling water of the engine when the hybrid vehicle runs in the limp home mode due to the sticking abnormality of the throttle valve. The electronic control unit performs the sticking restoration diagnosis at a lower temperature of cooing water when a state of charge of the battery is lower than a predetermined level, compared with when the state of charge of the battery is equal to or higher than the predetermined level.

In the case where the throttle valve of the engine has a sticking abnormality, the hybrid vehicle of this aspect controls the engine and the motor to run in the limp home mode in response to the driver's request. The hybrid vehicle of this aspect performs sticking restoration diagnosis of the throttle valve accompanied with an increase in temperature of cooling water of the engine when the hybrid vehicle runs in the limp home mode. This allows for diagnosis of whether the throttle valve is restored from the sticking abnormality. The sticking restoration diagnosis is performed at the lower temperature of cooling water of the engine when the state of charge of the battery is lower than the predetermined level, compared with when the state of charge of the battery is equal to or higher than the predetermined level. In the case where the sticking abnormality of the throttle valve is caused by biting of ice, the throttle valve is likely to be restored from the sticking abnormality in some biting state of ice even when the cooling water of the engine has only an insufficient increase of temperature. In the case where the sticking abnormality of the throttle valve is caused by biting of any foreign substance other than ice, the throttle valve is likely to be restored from the sticking abnormality by some chance. The lower state of charge of the battery leads to the shorter travel distance in the limp home mode, compared with the higher state of charge of the battery. Accordingly, in the case where the battery has a lower state of charge, it is preferable to perform the sticking restoration diagnosis at an earlier time, confirm that the throttle valve is restored from the sticking abnormality at an earlier time and return the hybrid vehicle to normal run at an earlier time, compared with in the case where the battery has a higher state of charge. As clearly understood from the foregoing, in the case where the battery has a lower state of charge, the sticking restoration diagnosis is performed at the lower temperature of cooling water of the engine, compared with in the case where the battery has a higher state of charge. This ensures the more adequate sticking restoration diagnosis. The state of charge herein means a ratio of power capacity dischargeable from the battery to the entire capacity of the battery.

DESCRIPTION OF EMBODIMENTS

The following describes some aspects of the present disclosure with reference to embodiments.

Figure 1:
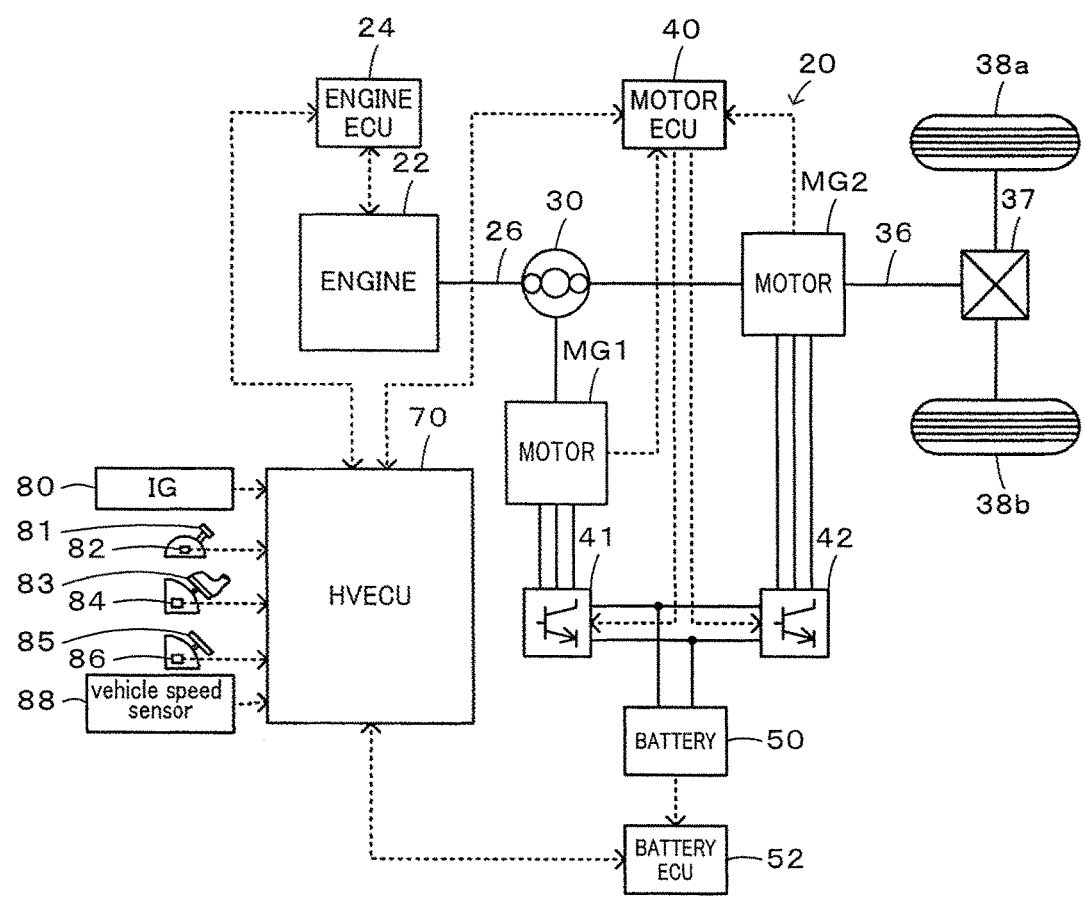
FIG. 1 is a configuration diagram illustrating the schematic configuration of a hybrid vehicle according to an embodiment of the present disclosure.

FIG. 1 is a configuration diagram illustrating the schematic configuration of a hybrid vehicle 20 according to one embodiment of the present disclosure. As illustrated, the hybrid vehicle 20 includes an engine 22, an engine electronic control unit (hereinafter referred to as engine ECU) 24, a planetary gear 30, a motor MG1, a motor MG2, inverters 41 and 42, a motor electronic control unit (hereinafter referred to as motor ECU) 40, a battery 50, a battery electronic control unit (hereinafter referred to as battery ECU) 52 and a hybrid electronic control unit (hereinafter referred to as HVECU) 70.

Figure 2:
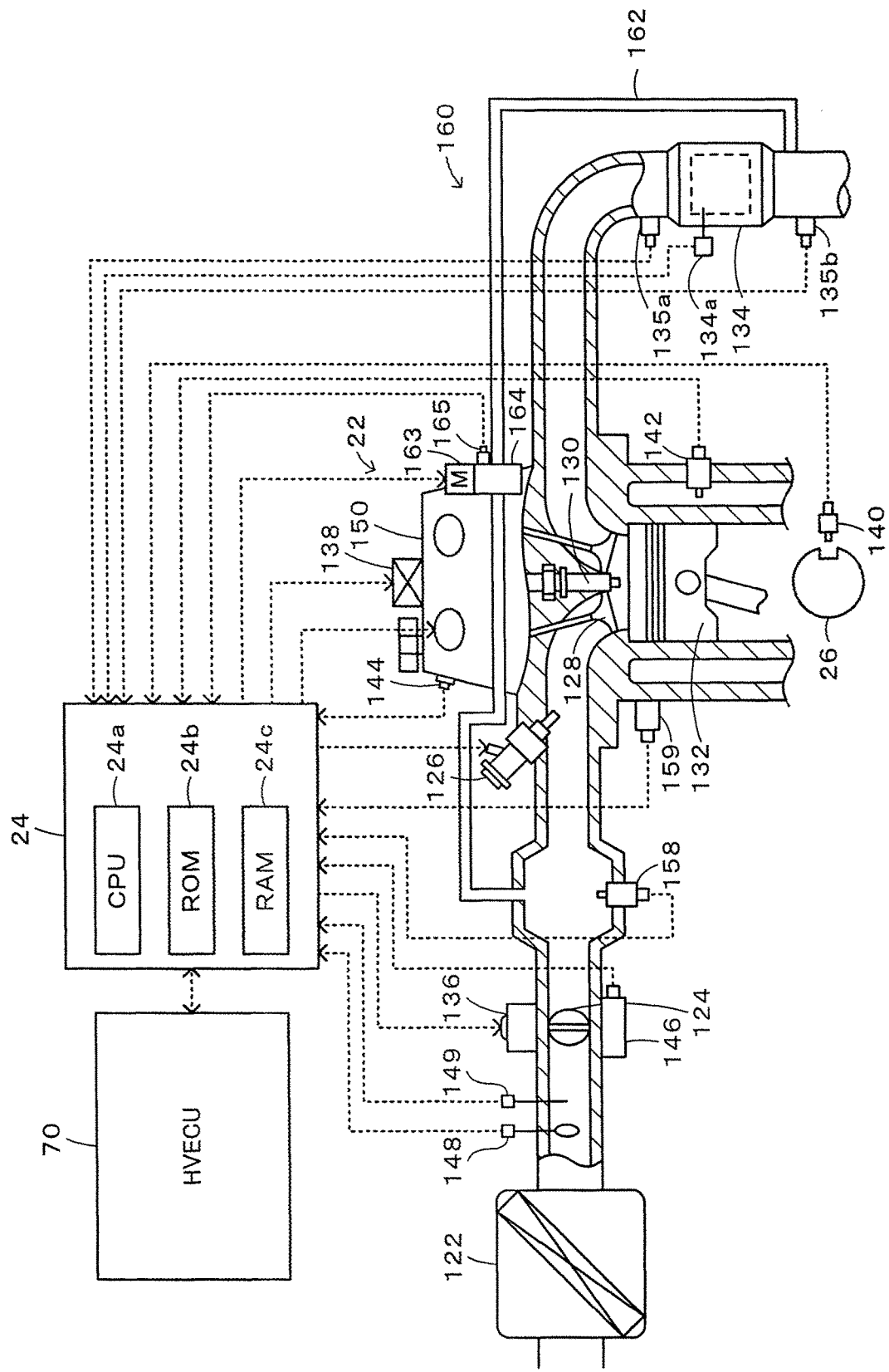
FIG. 2 is a configuration diagram illustrating the configuration of an engine.

The engine 22 is configured as an internal combustion engine that uses a hydrocarbon fuel such as gasoline or light oil to outputs power. As shown in FIG. 2, the engine 22 mixes the intake air cleaned by an air cleaner 122 and taken in via a throttle valve 124 with gasoline injected from a fuel injection valve 126 and draws the air-fuel mixture via an intake valve 128 into a combustion chamber. The drawn air-fuel mixture is explosively combusted with electric spark generated by a spark plug 130. The engine 22 converts the reciprocating motion of a piston 132 pressed down by the energy of explosive combustion into the rotational motion of a crankshaft 26. The exhaust gas from the engine 22 is discharged to the outside air through a catalytic converter 134 that is filled with a conversion catalyst (three-way catalyst) to convert toxic components such as carbon monoxide (CO), hydrocarbons (HC) and nitrogen oxides (NOx) to less toxic components. The exhaust gas is not fully discharged to the outside air but is partly supplied to the air intake system via an exhaust gas recirculation system (hereinafter referred to as EGR system) 160 that recirculates the exhaust gas to the intake air. The EGR system 160 includes an EGR pipe 162 that is connected downstream of the catalytic converter 134 and is configured to supply the exhaust gas to a surge tank of the air intake system and an EGR valve 164 that is located in the EGR pipe 162 and is driven by a stepping motor 163. The recirculated amount of the exhaust gas as uncombusted gas is regulated by adjusting the opening position of the EGR valve 164, and the regulated amount of the exhaust gas is recirculated to the air intake system. The engine 22 is configured to draw the mixture of the air, the exhaust gas and gasoline into the combustion chamber.

The engine ECU 24 is implemented by a CPU 24a-based microprocessor and includes a ROM 24b that stores processing programs, a RAM 24c that temporarily stores data, input and output ports (not shown) and a communication port (not shown), other than the CPU 24a. The engine ECU 24 inputs, via its input port, signals from various sensors that are configured to detect the conditions of the engine 22. The signals from the various sensors include, for example, a crank position from a crank position sensor 140 configured to detect the rotational position of the crankshaft 26, a cooling water temperature Tw from a water temperature sensor 142 configured to detect the temperature of cooling water of the engine 22, a cam position from a cam position sensor 144 configured to detect the rotational position of a cam shaft provided to open and close the intake valve 128 or an exhaust valve for intake into or exhaust from the combustion chamber, a throttle position TH from a throttle valve position sensor 146 configured to detect the position of a throttle valve 124, an amount of intake air Qa from an air flowmeter 148 mounted to an intake pipe, an intake air temperature Ta from a temperature sensor 149 mounted to the intake pipe, an intake air pressure Pin from an intake pressure sensor 158 configured to detect the internal pressure of the intake pipe, a catalyst temperature Tc from a temperature sensor 134a mounted to the catalytic converter 134, an air-fuel ratio AF from an air-fuel ratio sensor 135a, an oxygen signal $O_2$ from an oxygen sensor 135b, a knocking signal Ks from a knocking sensor 159 mounted to a cylinder block to detect a vibration induced by the occurrence of knocking, and an EGR valve 164 opening position EV from an EGR valve position sensor 165 configured to detect the opening position of the EGR valve 164. The engine ECU 24 outputs, via its output port, various control signals for driving the engine 22. The various control signals include a driving signal to the fuel injection valve 126, a driving signal to a throttle motor 136 configured to adjust the position of the throttle valve 124, a control signal to an ignition coil 138 integrated with an igniter, a control signal to a variable valve timing mechanism 150 configured to vary the open-close timing of the intake valve 128 and a driving signal to a stepping motor 163 configured to adjust the opening position of the EGR valve 164. The engine ECU 24 communicates with the HVECU 70 to perform operation control of the engine 22 in response to control signals from the HVECU 70 and output data regarding the operating conditions of the engine 22 as appropriate. The engine ECU 24 computes the rotation speed of the crankshaft 26 which is equal to a rotation speed Ne of the engine 22, based on the crank position from the crank position sensor 140, and computes the amount of intake air Qa from the air flowmeter 148. The engine ECU 24 also learns the characteristic of the amount of intake air Qa relative to the throttle position TH (throttle flow characteristic).

The planetary gear 30 is configured as a single pinion-type planetary gear mechanism. The planetary gear 30 has a sun gear, ring gear and a carrier that are respectively connected with a rotor of the motor MG1, with a driveshaft 36 linked with drive wheels 38a and 38b via a differential gear 37, and with the crankshaft 26 of the engine 22.

The motor MG1 is configured as a known synchronous motor generator having a rotor with permanent magnets embedded therein and a stator with three-phase coils wound thereon and includes the rotor connected with the sun gear of the planetary gear 30 as described above. The motor MG2 is configured as a synchronous motor generator like the motor MG1 and includes a rotor connected with the driveshaft 36. The motor ECU 40 controls the inverters 41 and 42 to drive the motors MG1 an MG2. The inverters 41 and 42 share a positive bus bar and a negative bus bar of power lines from the battery 50, so that electric power generated by either one of the motors MG1 and MG2 is suppliable to the other motor MG2 or MG1.

The motor ECU 40 is implemented by a CPU-based microprocessor and includes a ROM that stores processing programs, a RAM that temporarily stores data, input and output ports and a communication port other than the CPU, although not being illustrated. The motor ECU 40 inputs, via its input port, signals required for drive control of the motors MG1 and MG2. The signals input via the input port include, for example, rotational positions θm1 and θm2 from rotational position detection sensors configured to detect the rotational positions of the rotors of the motors MG1 and MG2 and phase currents applied to the motors MG1 and MG2 and detected by current sensors (not shown). The motor ECU 40 outputs, via its output port, for example, switching control signals to the inverters 41 and 42. The motor ECU 40 communicates with the HVECU 70 to perform drive control of the motors MG1 and MG2 in response to control signals from the HVECU 70 and output data regarding the operating conditions of the motors MG1 and MG2 to the HVECU 70 as appropriate. The motor ECU 40 computes rotation speeds Nm1 and Nm2 of the motors MG1 and MG2, based on the rotational positions θm1 and θm2 of the rotors of the motors MG1 and MG2 from the rotational position detection sensors.

The battery ECU 52 is implemented by a CPU-based microprocessor and includes a ROM that stores processing programs, a RAM that temporarily stores data, input and output ports and a communication port other than the CPU, although not being illustrated. The battery ECU 52 inputs signals required for management of the battery 50, for example, a battery voltage Vb from a voltage sensor (not shown) provided between terminals of the battery 50, a battery current Ib from a current sensor (not shown) mounted to a power line connected with an output terminal of the battery 50 and a battery temperature Tb from a temperature sensor (not shown) mounted to the battery 50. The battery ECU 52 sends data regarding the conditions of the battery 50 to the HVECU 70 by communication as appropriate. The battery ECU 52 computes a state of charge SOC, which denotes a ratio of power capacity dischargeable from the battery 50 to the entire capacity of the battery 50, based on an integral value of the battery current Ib detected by the current sensor, for the purpose of management of the battery 50. The battery ECU 52 also computers input and output limits Win and Wout-, which denote maximum allowable powers chargeable into and dischargeable from the battery 50, based on the computed state of charge SOC and the battery temperature Tb.

The HVECU 70 is implemented by a CPU-based microprocessor and includes a ROM that stores processing programs, a RAM that temporarily stores data, a non-transitory flash memory that holds stored data, input and output ports and a communication port other than the CPU, although not being illustrated. The HVECU 70 inputs various signals via its input port. The signals input via the input port include, for example, an ignition signal from an ignition switch 80, a shift position SP from a shift position sensor 82 configured to detect the operational position of a shift lever 81, an accelerator position Acc from an accelerator pedal position sensor 84 configured to detect the depression amount of an accelerator pedal 83, a brake pedal position BP from a brake pedal position sensor 86 configured to detect the depression amount of a brake pedal 85 and a vehicle speed V from a vehicle speed sensor 88. As described above, the HVECU 70 is connected with the engine ECU 24, the motor ECU 40 and the battery ECU 52 via the communication ports to transmit various control signals and data to and from the engine ECU 24, the motor ECU 40 and the battery ECU 52.

Figure 3:
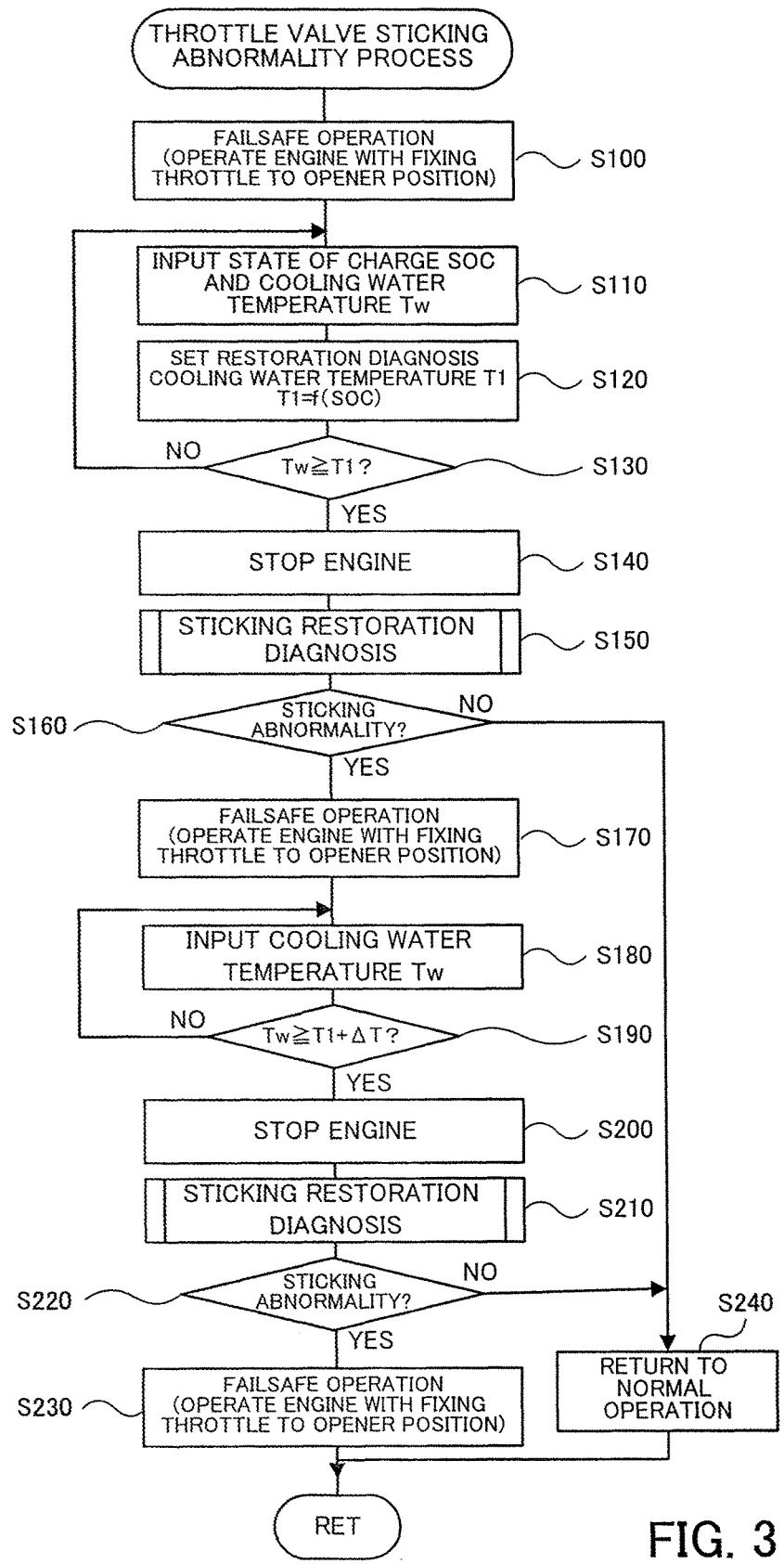
FIG. 3 is a flowchart showing one example of a throttle valve sticking abnormality process performed by an HVECU.

The following describes the operations of the hybrid vehicle 20 of the embodiment having the above configuration or more specifically the operation in the case where the throttle valve 124 of the engine 22 bites some foreign substance and is stuck to cause an abnormality. FIG. 3 is a flowchart showing an example of a throttle valve sticking abnormality process performed by the HVECU 70.

On start of the throttle valve sticking abnormality process, the HVECU 70 first performs drive control according to the driver's depression amount of the accelerator pedal 83 to cause the hybrid vehicle 20 to run by failsafe operation (limp home mode). In this case, the failsafe operation (limp home mode) may, for example, control the engine 22, the motor MG1 and the motor MG2 as described below. The limp home mode performs operation control of the engine 22 without driving the throttle motor 136 but with fixing the throttle valve 124 to the opening position in the state that sticking abnormality occurs (opener position) (step S100). The limp home mode performs drive control of the motor MG1 to control the rotation speed Ne of the engine 22, for example, in a specified rotation speed range and thereby prevent the engine 22 from revving up. The limp home mode performs drive control of the motor MG2 to output a required torque Tr* demanded by the driver to the driveshaft 36. Such control causes the hybrid vehicle 20 to run in the limp home mode by the motor MG2, accompanied with power generation by the motor MG1 based on the power from the engine 22 according to the opener position of the throttle valve 124.

Figure 4:
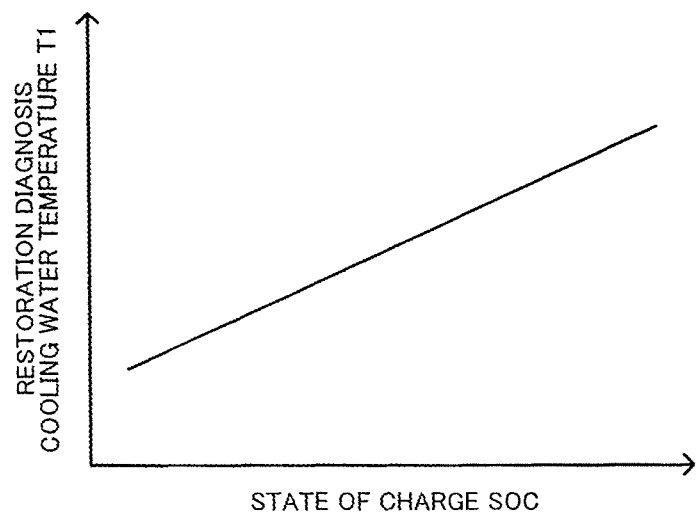
FIG. 4 is a diagram illustrating one example of a restoration diagnosis cooling water temperature setting map.

The HVECU 70 subsequently inputs the state of charge SOC of the battery 50 and the temperature of cooling water (cooling water temperature) Tw of the engine 22 (step S110). According to this embodiment, the input state of charge SOC is computed by the battery ECU 52 and is received from the battery ECU 52 by communication. The input cooling water temperature Tw is detected by the water temperature sensor 142 and is received from the engine ECU 24 by communication. The HVECU 70 sets a restoration diagnosis cooling water temperature T1 based on the input state of charge SOC of the battery 50 (step S120) and compares the input cooling water temperature Tw with the set restoration diagnosis cooling water temperature T1 (step S130). According to this embodiment, a procedure of setting the restoration diagnosis cooling water temperature T1 specifies a relationship between the state of charge SOC and the restoration diagnosis cooling water temperature T1 in advance such that the restoration diagnosis cooling water temperature T1 decreases with a decrease in state of charge SOC of the battery 50, stores the specified relationship as a restoration diagnosis cooling water temperature setting map and reads the restoration diagnosis cooling water temperature T1 corresponding to a given state of charge SOC from the map. One example of the restoration diagnosis cooling water temperature setting map is shown in FIG. 4. The map of FIG. 4 is set such that the restoration diagnosis cooling water temperature T1 decreases with a decrease in state of charge SOC. In other words, the restoration diagnosis cooling water temperature T1 is set to a lower temperature value at the state of charge SOC that is lower than a predetermined level, compared with the temperature value set at the state of charge SOC that is higher than the predetermined level. When the cooling water temperature Tw is lower than the set restoration diagnosis cooling water temperature T1, the processing flow goes back to step S110. In other words, the processing of steps S110 to S130 is repeated until the cooling water temperature Tw becomes equal to or higher than the restoration diagnosis cooling water temperature T1.

When the cooling water temperature Tw becomes equal to or higher than the restoration diagnosis cooling water temperature T1, the HVECU 70 stops the engine 22 (step S140) and performs a sticking restoration diagnosis process to determine whether the throttle valve 124 is restored from the sticking abnormality (steps S150 and S160). The sticking restoration diagnosis process may, for example, drive the throttle motor 136 to set the opening position of the throttle valve 124 to a predetermined relatively large opening position, confirm whether the opening position of the throttle valve 124 is set to the predetermined relatively large opening position by the throttle valve position sensor 146, subsequently drive the throttle motor 136 to set the opening position of the throttle valve 124 to the value 0, and confirm whether the opening position of the throttle valve 124 is set to the value 0 by the throttle valve position sensor 146. The sticking restoration diagnosis process changes the opening position of the throttle valve 124 in this way. Performing the sticking restoration diagnosis process during operation of the engine 22 is thus likely to rev up the engine 22. The processing flow of the embodiment accordingly stops the engine 22 before performing the sticking restoration diagnosis. When the sticking restoration diagnosis determines that the throttle valve 124 is restored from the sticking abnormality (i.e., the sticking abnormality is eliminated), the HVECU 70 returns the hybrid vehicle 20 from the failsafe operation (limp home mode) to normal operation (step S240) and terminates this process. As described above, the restoration diagnosis cooling water temperature T1 is set to decrease with a decrease in state of charge SOC of the battery 50. The sticking restoration diagnosis is accordingly performed at the lower cooling water temperature Tw according to the lower state of charge SOC. This is because the lower state of charge SOC of the battery 50 provides the shorter travel distance in the limp home mode. This leads to the need for earlier diagnosis of whether the throttle valve 124 is restored from the sticking abnormality and the need for the hybrid vehicle 20 to return to normal operation at an earlier time.

When the sticking restoration diagnosis determines that the throttle valve 124 is not restored from the sticking abnormality (i.e., the sticking abnormality continues), the HVECU 70 starts the engine 22 and performs the failsafe operation (limp home mode) with fixing the throttle valve 124 to the opener position again (step S170) and waits until the cooling water temperature Tw becomes equal to or higher than a temperature specified by adding a predetermined temperature ΔT to the restoration diagnosis cooling water temperature T1 (steps S180 and S190). The predetermined temperature ΔT may be, for example, 5° C. or 10° C. When the cooling water temperature Tw becomes equal to or higher than the temperature specified by adding the predetermined temperature ΔT to the restoration diagnosis cooling water temperature T1, the HVECU 70 stops the engine 22 (step S200) and performs the sticking restoration diagnosis process again (steps S210 and S220). In the case where the sticking abnormality of the throttle valve 124 is caused by biting of ice, an increase in temperature of cooling water of the engine 22 is likely to melt the ice and thereby eliminate the sticking abnormality. Another sticking restoration diagnosis is performed to confirm whether the sticking abnormality is eliminated. The processing flow of this embodiment waits for an increase of the cooling water temperature Tw by the predetermined temperature ΔT after the previous sticking restoration diagnosis and then performs another sticking restoration diagnosis. This waits for melting of ice to eliminate the sticking abnormality. When another sticking restoration diagnosis determines that the throttle valve 124 is restored from the sticking abnormality (i.e., the sticking abnormality is eliminated), the HVECU 70 returns the hybrid vehicle 20 from the failsafe operation (limp home mode) to normal operation (step S240) and terminates this process. When another sticking restoration diagnosis determines that the throttle valve 124 is not restored from the sticking abnormality (i.e., the sticking abnormality continues), on the other hand, the HVECU 70 starts the engine 22 and performs the failsafe operation (limp home mode) with fixing the throttle valve 124 to the opener position again (step S230) and terminates this process.

As described above, when the throttle valve 124 has sticking abnormality, the hybrid vehicle 20 of the embodiment runs by the failsafe operation (limp home mode) with fixing the throttle valve 124 to the opener position. The hybrid vehicle 20 of the embodiment sets the restoration diagnosis cooling water temperature T1 to decrease with a decrease in state of charge SOC of the battery 50 and performs the sticking restoration diagnosis to determine whether the throttle valve 124 is restored from the sticking abnormality when the cooling water temperature Tw of the engine 22 becomes equal to or higher than the restoration diagnosis cooling water temperature T1. This configuration allows for earlier diagnosis of whether the throttle valve 124 is restored from the sticking abnormality at the lower state of charge SOC of the battery 50 and thereby enables the hybrid vehicle 20 to return to normal operation at an earlier time. As a result, this ensures the more accurate sticking restoration diagnosis.

When the sticking restoration diagnosis performed at the cooling water temperature Tw of the engine 22 increasing to or above the restoration diagnosis cooling water temperature T1 determines that the throttle valve 124 is not restored from the sticking abnormality, the hybrid vehicle 20 of the embodiment starts the engine 22 and performs the failsafe operation (limp home mode) with fixing the throttle valve 124 to the opener position again. The hybrid vehicle 20 performs another sticking restoration diagnosis when the cooling water temperature Tw of the engine 22 becomes equal to or higher than the temperature specified by adding the predetermined temperature ΔT to the restoration diagnosis cooling water temperature T1. In the case where the sticking abnormality of the throttle valve 124 is caused by biting of ice, the hybrid vehicle 20 can more adequately diagnose that an increase in temperature of cooling water of the engine 22 melts the ice and eliminates the sticking abnormality and can thus return to normal operation. As a result, this ensures the more adequate sticking restoration diagnosis.

Figure 5:
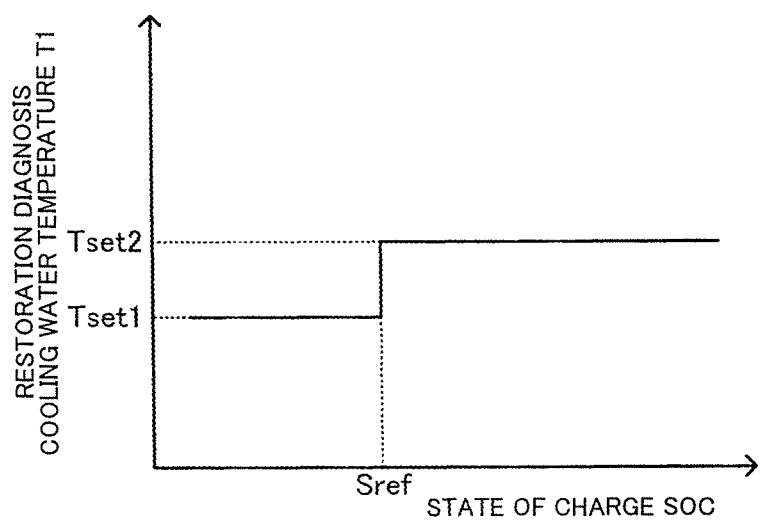
FIG. 5 is a diagram illustrating another example of the restoration diagnosis cooling water temperature setting map according to a modification.

In the case where the throttle valve 124 has the sticking abnormality, the hybrid vehicle 20 of the embodiment uses the map of FIG. 4 to set the restoration diagnosis cooling water temperature T1 such as to decrease with a decrease in state of charge SOC of the battery 50. As shown in a map of FIG. 5, however, a modification may set a value Tset1 to the restoration diagnosis cooling water temperature T1 when the state of charge SOC of the battery 50 is lower than a reference value Sref and set a value Tset2 that is larger than the value Tset1 to the restoration diagnosis cooling water temperature T1 when the state of charge SOC of the battery 50 is equal to or higher than the reference value Sref. In this modification, the predetermined temperature ΔT as the criterion for performing another sticking restoration diagnosis may be a difference between the value Tset2 and the value Tset1 (ΔT=Tset2−Tset1).

When another sticking restoration diagnosis determines that the throttle valve 124 is not restored from the sticking abnormality, the hybrid vehicle 20 of the embodiment performs the failsafe operation (limp home mode) with fixing the throttle valve 124 to the opener position and then terminates the throttle valve sticking abnormality process. A modification may, however, perform sticking restoration diagnosis multiple number of times, i.e., every time the cooling water temperature Tw is increased by the predetermined temperature ΔT.

The above embodiment describes application of the present disclosure to the hybrid vehicle 20 that includes the engine 22, the motor MG1, the motor MG2 and the planetary gear 30. The present disclosure is, however, not limited to the hybrid vehicle of this configuration but may be applicable to a hybrid vehicle of any configuration that includes an engine, a motor configured to output power for running and a battery configured to supply electric power to the motor.

In the hybrid vehicle of this aspect, the restoration diagnose may perform the sticking restoration diagnosis at the lower temperature of cooling water according to a lower state of charge of the battery. This aspect enables the sticking restoration diagnosis to be performed more adequately according to the state of charge of the battery.

Further, in the hybrid vehicle of this aspect, the electronic control unit may perform operation control of the engine in a state that power supply to an actuator for driving the throttle valve is cut off, when the hybrid vehicle runs in the limp home mode due to the sticking abnormality of the throttle valve. This aspect enables the temperature of cooling water of the engine to be increased promptly while using some of the power from the engine to cause the hybrid vehicle to run in the limp home mode. This increases the travel distance in the limp home mode and ensures the more prompt sticking restoration diagnosis.

In the hybrid vehicle of this aspect, when there is a need for performing the sticking restoration diagnosis in a state that the engine is being operated, the electronic control unit may stop the engine before performing the sticking restoration diagnosis. This aspect suppresses the effect of a change in engine torque accompanied with actuation of the throttle valve by the sticking restoration diagnosis on the run of the hybrid vehicle in the limp home mode. In this case, when the sticking restoration diagnosis performed by the electronic control unit after the stop of the engine determines that the sticking abnormality continues, the electronic control unit may control the engine to restart the engine and cause the hybrid vehicle to run in the limp home mode. This aspect uses some of the power from the engine to cause the hybrid vehicle to run in the limp home mode and thereby increases the travel distance in the limp home mode.

In the hybrid vehicle of this aspect, when the sticking restoration diagnosis determines that the sticking abnormality continues, the electronic control unit may perform the sticking restoration diagnosis multiple number of times accompanied with an increase in temperature of cooling water. This aspect performs another sticking restoration diagnosis to determine whether the throttle valve is restored from the sticking abnormality and enables the hybrid vehicle to be switched from run in the limp home mode to normal run.

The following describes the correspondence relationship between the primary components of the embodiment and the primary components of the present disclosure described in Summary. The engine 22 of the embodiment corresponds to the "engine"; the motor MG2 corresponds to the "motor"; and the battery 50 corresponds to the "battery". The HVECU 70, the engine ECU 24 and the motor ECU 40 of the embodiment correspond to the "electronic control unit". The HVECU 70 of the embodiment corresponds to the "electronic control unit".

The correspondence relationship between the primary components of the embodiment and the primary components of the present disclosure, regarding which the problem is described in Summary, should not be considered to limit the components of the present disclosure, regarding which the problem is described in Summary, since the embodiment is only illustrative to specifically describes the aspects of the present disclosure, regarding which the problem is described in Summary. In other words, the present disclosure, regarding which the problem is described in Summary, should be interpreted on the basis of the description in the Summary, and the embodiment is only a specific example of the present disclosure, regarding which the problem is described in Summary.

The aspect of the present disclosure is described above with reference to the embodiment. The present disclosure is, however, not limited to the above embodiment but various modifications and variations may be made to the embodiment without departing from the scope of the present disclosure.

INDUSTRIAL APPLICABILITY

The technique of the present disclosure is applicable to the manufacturing industries of hybrid vehicle.

The invention claimed is:
1. A hybrid vehicle, comprising:
an engine;
a motor that is configured to output power for running;
a battery that is configured to supply electric power to the motor; and
an electronic control unit operatively connected to the engine, the electronic control unit configured to;
control the engine and the motor such as to cause the hybrid vehicle to run in a limp home mode in response to a driver's request when a throttle valve of the engine has a sticking abnormality; and
perform sticking restoration diagnosis of the throttle valve accompanied with an increase in temperature of cooling water of the engine when the hybrid vehicle runs in the limp home mode due to the sticking abnormality of the throttle valve, wherein
the electronic control unit performs the sticking restoration diagnosis at a lower temperature of cooling water when a state of charge of the battery is lower than a predetermined level, compared with when the state of charge of the battery is equal to or higher than the predetermined level.

2. The hybrid vehicle according to claim 1,
wherein the electronic control unit performs the sticking restoration diagnosis at the lower temperature of cooling water according to a lower state of charge of the battery.

3. The hybrid vehicle according to claim 2,
wherein the electronic control unit performs operation control of the engine in a state that power supply to an actuator for driving the throttle valve is cut off, when the hybrid vehicle runs in the limp home mode due to the sticking abnormality of the throttle valve.

4. The hybrid vehicle according to claim 2,
wherein when there is a need for performing the sticking restoration diagnosis in a state that the engine is being operated, the electronic control unit stops the engine before performing the sticking restoration diagnosis.

5. The hybrid vehicle according to claim 4,
wherein when the sticking restoration diagnosis performed by the electronic control unit after the stop of the engine determines that the sticking abnormality continues, the electronic control unit controls the engine to restart the engine and cause the hybrid vehicle to run in the limp home mode.

6. The hybrid vehicle according to claim 2,
wherein when the sticking restoration diagnosis determines that the sticking abnormality continues, the electronic control unit performs the sticking restoration diagnosis multiple number of times accompanied with an increase in temperature of cooling water.

7. The hybrid vehicle according to claim 1,
wherein the electronic control unit performs operation control of the engine in a state that power supply to an actuator for driving the throttle valve is cut off, when the hybrid vehicle runs in the limp home mode due to the sticking abnormality of the throttle valve.

8. The hybrid vehicle according to claim 7,
wherein when there is a need for performing the sticking restoration diagnosis in a state that the engine is being operated, the electronic control unit stops the engine before performing the sticking restoration diagnosis.

9. The hybrid vehicle according to claim 8,
wherein when the sticking restoration diagnosis performed by the electronic control unit after the stop of the engine determines that the sticking abnormality continues, the electronic control unit controls the engine to restart the engine and cause the hybrid vehicle to run in the limp home mode.

10. The hybrid vehicle according to claim 7,
wherein when the sticking restoration diagnosis determines that the sticking abnormality continues, the electronic control unit performs the sticking restoration diagnosis multiple number of times accompanied with an increase in temperature of cooling water.

11. The hybrid vehicle according to claim 1,
wherein when there is a need for performing the sticking restoration diagnosis in a state that the engine is being operated, the electronic control unit stops the engine before performing the sticking restoration diagnosis.

12. The hybrid vehicle according to claim 11,
wherein when the sticking restoration diagnosis performed by the electronic control unit after the stop of the engine determines that the sticking abnormality continues, the electronic control unit controls the engine to restart the engine and cause the hybrid vehicle to run in the limp home mode.

13. The hybrid vehicle according to claim 1,
wherein when the sticking restoration diagnosis determines that the sticking abnormality continues, the electronic control unit performs the sticking restoration diagnosis multiple number of times accompanied with an increase in temperature of cooling water.

* * * * *